United States Patent [19]

Takahashi

[11] Patent Number: 4,991,300
[45] Date of Patent: Feb. 12, 1991

[54] LEAD AUTOMATIC SUPPLY DEVICE FOR X-Y PLOTTER

[75] Inventor: Isamu Takahashi, Tokyo, Japan
[73] Assignee: Mutoh Industries Ltd., Tokyo, Japan
[21] Appl. No.: 445,989
[22] Filed: Nov. 22, 1989

[30] Foreign Application Priority Data

Mar. 15, 1989 [JP] Japan .............................. 1-63279

[51] Int. Cl.$^5$ ............................................ G01D 15/16
[52] U.S. Cl. .............................. 33/18.2; 346/139 C; 346/139 R
[58] Field of Search ............... 33/18.1, 18.2, 35, 36, 33/37, 27.11; 401/89, 92, 56; 346/139 C, 139 R

[56] References Cited

U.S. PATENT DOCUMENTS

| | | | |
|---|---|---|---|
| 3,293,658 | 12/1966 | Sicking | 346/139 R |
| 3,939,482 | 2/1976 | Coffer | 346/139 C |
| 4,324,047 | 4/1982 | Roch | 33/18.1 |
| 4,683,476 | 7/1987 | Ferrari et al. | 346/139 R |
| 4,812,858 | 3/1989 | Murray | 346/139 R |
| 4,825,556 | 5/1989 | Goldfarb | 33/18.1 |
| 4,905,016 | 2/1990 | Kobayashi et al. | 346/139 C |

Primary Examiner—Allan N. Shoap
Assistant Examiner—William C. Dowling
Attorney, Agent, or Firm—Wenderoth, Lind & Ponack

[57] ABSTRACT

A lead automatic supply device for an X-Y plotter has a writing implement stocker connected to a first rotary drive device, and a lead supply stocker rotatably disposed above the writing implement stocker. The lead supply stocker is connected to a second rotary drive device, and a circular line passing through lead storage containers provided in the lead supply stocker and a circular line passing through writing implements retained on the writing implement holding portion of the writing implement stocker lie in the same cylindrical plane. A lead fall hole is provided in the bottom portion of each lead storage container, and an opening/closing mechanism is provided at the lower part of the lead fall hole for opening and closing the lead fall hole. An opening/closing control for controlling the opening/closing mechanism and a lead push down mechanism for pushing the lead downward from the mechanism are also provided. The writing implement stocker can rotatably shift an empty writing implement to a lead supply position, and the lead supply stocker rotates a desired lead storage container to a position immediately above the empty writing implement. In this condition, the lead in the lead storage container is caused to fall downward through the lead fall hole toward the writing implement without a lead located below the lead fall hole by opening the opening/closing mechanism, and the lead is pushed into the writing implement by the lead push-down mechanism.

1 Claim, 6 Drawing Sheets

LEAD AUTOMATIC SUPPLY DEVICE FOR X-Y PLOTTER

FIELD OF THE INVENTION

This invention relates to a lead automatic supply device for an X-Y plotter in which drawing is carried automatically out on a drawing screen by using a writing implement having a built-in refill such as lead.

In Japanese Patent Publication No. 56-34982, a turret type X-Y plotter is disclosed in which a plurality of leads are retained in a turret type magazine of a plotter head, and pressure is applied to a desired lead by means of a push pin to place the desired lead in contact with a drawing surface whereby drawing is carried out on the drawing surface by means of the lead. Also, in Japanese Patent Laid-Open Appln. No. 57-138997, an X-Y plotter is disclosed in which a lead stocker of rotary type, namely a carousel, is provided at the machine side, and a respective lead cartridge holding a lead is retained on each of a plurality of pen holding units of the carousel. An exchange of the lead cartridge is carried out mutually between the pen at the drawing head side and the pen holding unit of the carousel. Furthermore, in Japanese Utility Model Publication No. 60-80996, an X-Y plotter is disclosed in which a lead case is provided in a writing block provided on a drawing head, and one lead in the lead case is supplied to a holder in the writing block and drawing is carried out on the drawing surface by the lead retained by the holder.

Furthermore, in Japanese Patent Laid-Open Appln. No. 61-132394, an X-Y plotter is disclosed in which a writing implement having a built-in lead automatic propelling mechanism is retained in a plurality of pen holding units of a writing implement stocker provided on the machine, and an exchange of the writing implements is carried out mutually between the pen holding unit at the stocker side and the pen holding unit at the drawing head side.

In both the turret type X-Y plotter and the X-Y plotter in which the lead case provided on the drawing head supported a plurality of lead cartridges holding a plurality of leads, the structure of the drawing head is complicated and therefore heavy, thereby inhibiting the control of high speed drawing. Also, in the X-Y plotter in which the writing implement stocker was provided at the machine side, and the writing implement was retained in a plurality of pen holding units, since a mechanism of supplementing the leads to the writing implement at the writing implement stocker side is provided, a writing implement of the writing implement stocker which runs out of leads is required to be exchanged with a writing implement having leads by a manual operation which is extremely inconvenient.

An object of this invention is to eliminate the foregoing drawbacks.

DETAILED DESCRIPTION OF THE PREFERRED EMBODIMENT

The invention will now be described in detail by referring to embodiments thereof illustrated in the attached drawings.

Figure 1:
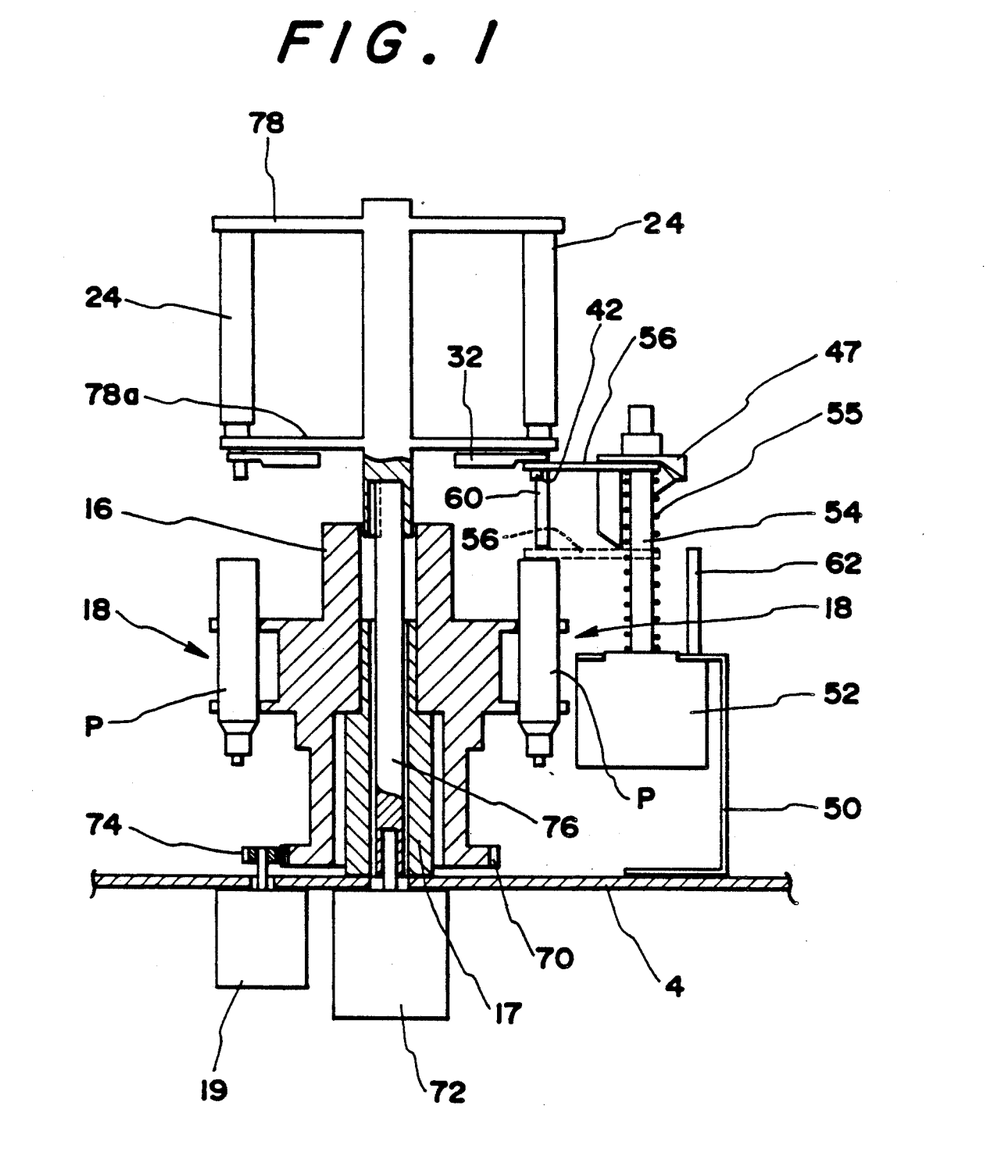
FIG. 1 is a vertical elevation view, partly in section, of an automatic lead supply device according to the present invention.
Figures 2, 3:
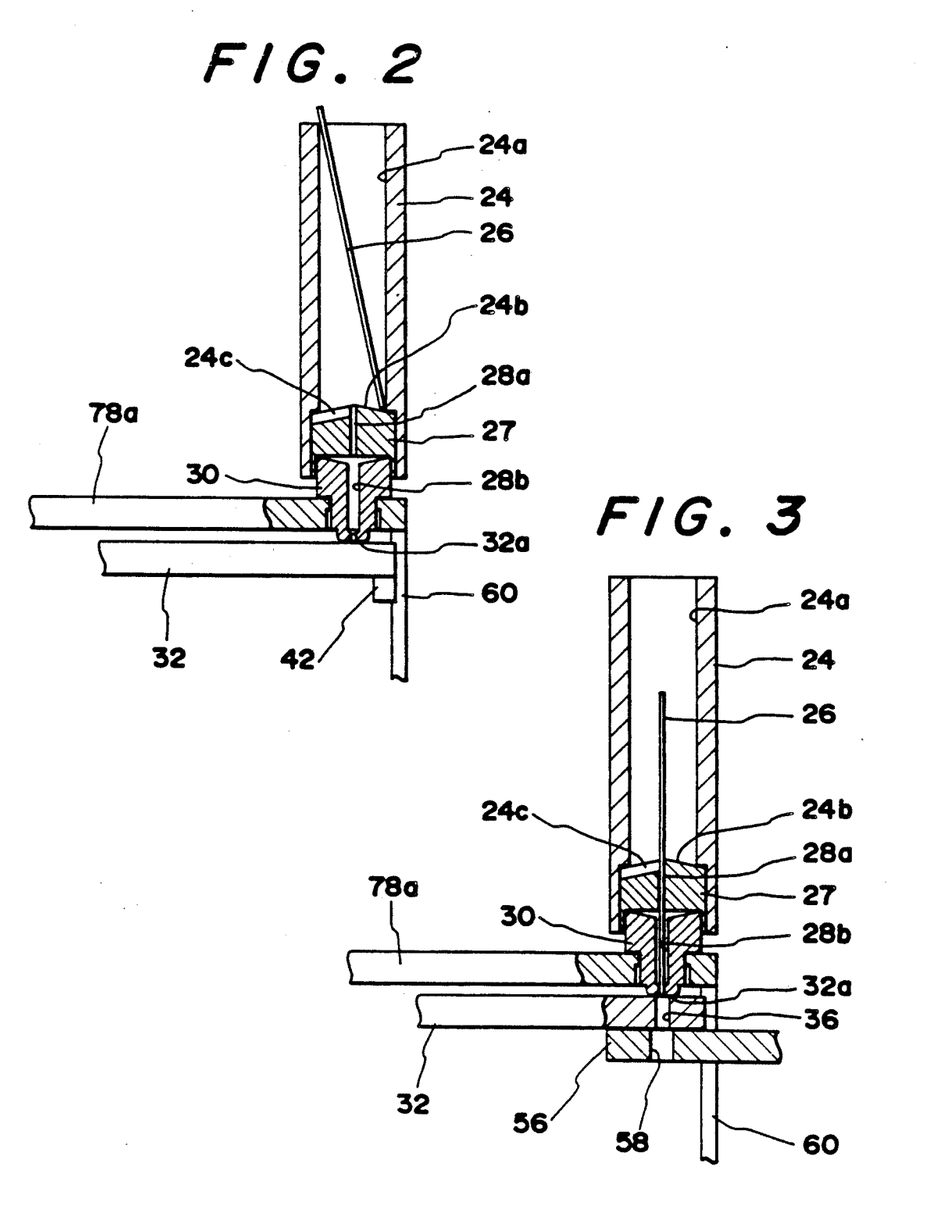
FIG. 2 is a vertical elevation view, partly in section, of a lead storage supply container of the device shown in FIG. 1.
FIG. 3 is a view similar to FIG. 2.
Figure 4:
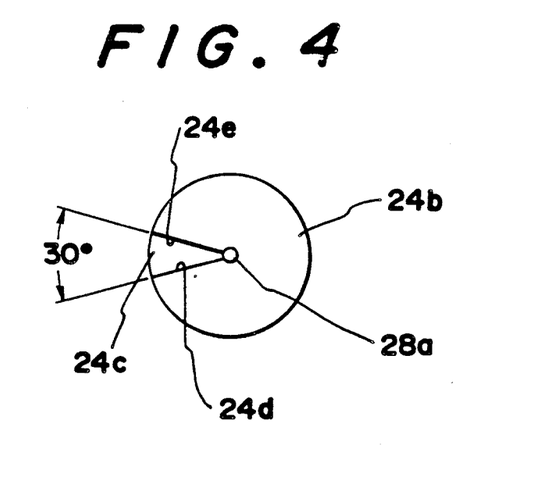
FIG. 4 is a plan view of a lead receiving tray of the container shown in FIGS. 2 and 3.
Figure 5:
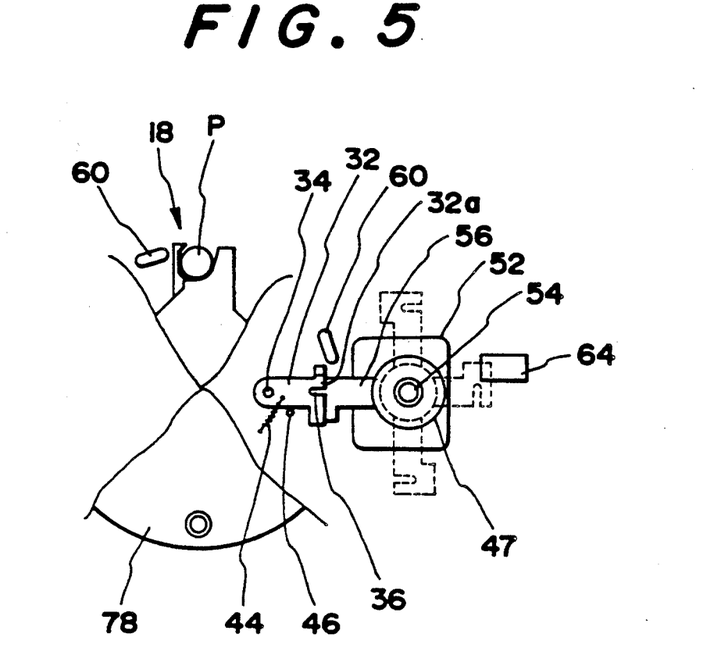
FIG. 5 is a plan view of a portion of the device shown in FIG. 1.
Figure 6:
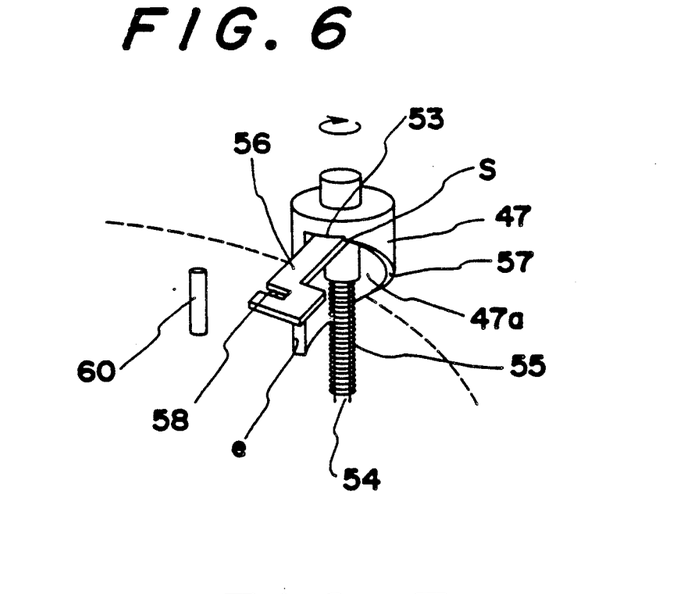
FIG. 6 is a perspective view of a portion of the device shown in FIG. 1.
Figure 7:
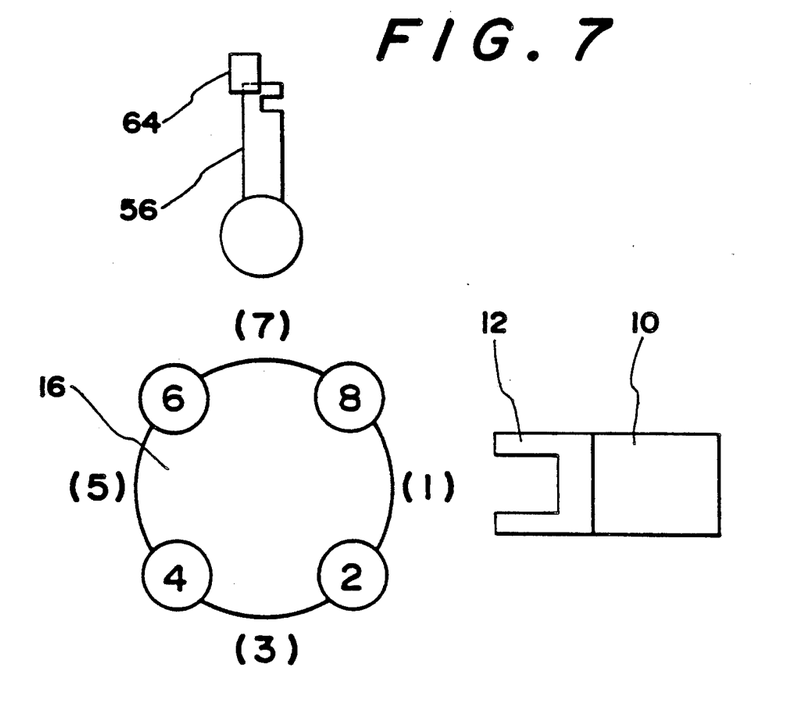
FIG. 7 is an explanatory drawing illustrating an operating principle of the present invention.
Figure 8:
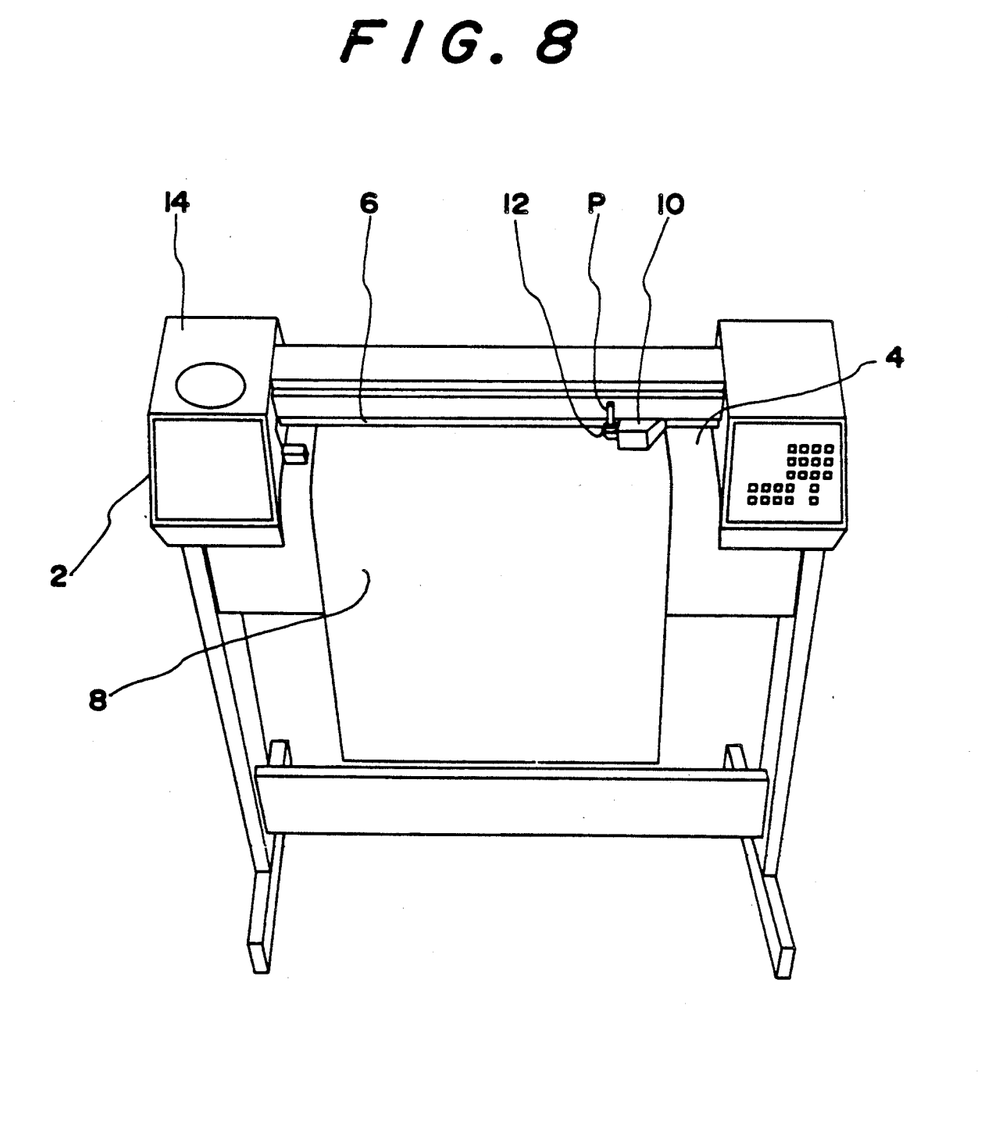
FIG. 8 is a perspective view of an X-Y plotter employing the device shown in FIG. 1.

In FIG. 8, reference numeral 2 denotes a machine proper of an X-Y plotter of a paper drive type, and a Y rail 6 is horizontally fixed onto a paper supporting plate 4. Both sides of the paper 8 on the supporting plate 4 are supported by a pinch roller mechanism consisting of a drive roller and a holding roller disposed at both sides of the supporting plate 4, and the paper 8 on the supporting plate 4 is fed back and forth (+ −X direction) by the rotation of the drive roller driven by an X motor. On the Y rail 6, a drawing head 10 is mounted so as to be shiftable along the rail 6 by a Y motor. Reference numeral 12 denotes a writing implement holding unit provided on the drawing head 10, and the holding unit 12 is interlocked with a pen lifting mechanism built in the drawing head 10. At one end side of the Y rail 6, a box 14 is disposed, and a writing implement stocker 16 (carousel) of a rotary type is disposed in the box 14 as shown in FIG. 1. The writing implement stocker 16 is supported on a tubular member 17 detachably and rotatably fixed to a base of the box 14. A gear 70 formed on an external peripheral portion of the writing implement stocker 16 is meshed with a pinion gear 74 fixed to an output shaft of a stocker rotary motor 19 fixed to the base. The gears 74 and 70 come to mesh automatically when the writing implement stocker 16 is mounted to the tubular member 17. The motor 19 is connected to a controller controlled by a computer. Writing implement holding units 18 are formed on the stocker 16 at fixed intervals, and a writing implement P is detachably retained on each holding unit 18. An exchange of the writing implement P is carried out automatically and mutually between a desired writing implement holding unit and the writing implement holding unit 12 of the drawing head 10. The details associated with the automatic exchange of the writing implement are well known and do not form the gist of the present invention and therefore, a detailed description thereof is omitted herein. The writing implement P has a lead inserting hole for receiving an expendable lead, and the upper end of the hole is open at the center of the upper end surface of the writing implement P. The internal structure of the writing implement P is disclosed in detail in Japanese Patent Laid-Open Appln. No. 61-132394. A lead supply tank rotating motor 72 is fixed to the base of the box 14, and a rotary shaft 76 loosely fitted to the tubular member 17 is fixed to the motor 72. Reference numeral 78 denotes a lead supply stocker, and four cylindrical lead storage containers 24 are retained on the stocker at intervals identical to those at which the writing implement holding units 18 are spaced from one another. A circular line passing through the lead storage containers 24 and a circular line passing through the writing implements P retained on the writing implement holding units 18 lie in the same cylindrical plane. The lower end of the lead supply stocker 78 is keyed to the upper end of the rotary shaft 76. The stockers 16, 78 are constructed in such a way that they can be mounted or removed from the box 14 through a hole formed in the upper part of the box 14. In the lead supply storage container 24, as shown in FIG. 2, a lead storage portion 24a for storing a plurality of writing leads 26 is formed. Reference numeral 27 denotes a lead receiving tray of a disc type fixed to the bottom portion of the lead storage container 24, and the upper part thereof has a conical shape defined by a moderate external tapered surface 24b. A mounting tube 30 is fixed to a tubular lower end of the lead receiving tray 27, and is fitted and fixed to a hole in the outer diametral portion of a lower horizontal disc portion 78a of the lead supply stocker 78. At the center of the lead receiving tray 27, a lead fall hole 28a extends in the axial direction. The lead fall hole 28a communicates with a lead fall hole 28b extending through the mounting tube 30 in the axial direction. The lower end of the mounting tube 30 projects by a fixed length from the undersurface of the lower horizontal disc portion 78a of the lead supply stocker 78, and the lower end of the lead fall hole 28b is open at the lower end of the mounting tube 30. Reference numeral 24c denotes a lead guide groove extending in the upper surface of the lead receiving tray 27 by a predetermined depth. As shown in FIG. 4, the groove is nearly V-shaped, defined by a pair of walls 24d, 24e which converge toward the lead fall hole 28a. An angle formed between wall 24e and wall 24d is 30°. The surface of tray 30 defining the bottom of the lead guide groove 24c is parallel to the external conical surface 24b as shown in FIG. 2. Reference numeral 32 denotes a shutter plate provided for each lead storage container 24, one end portion of which is rotatably supported at 34 on the disc portion 78a. At the free end of the arm 32 are formed a recess 36, a shielded surface 32a adjacent said recess 36 and a projecting portion 42 positioned below the shielded surface 32a. The shutter plate 32 is biased into contact with a stopper 46 projecting from the disc portion 78a owing to a tensile force exerted by a spring 44. In this condition, the shielded surface 32a of the shutter plate 32 is positioned below the lead fall hole 28b, and closes the lower end of the lead fall hole 28b. In FIG. 1, reference numeral 50 denotes a bracket fixed to the base of the box 14. A motor 52 having a speed reducer and controlled by the controller is fixed to the bracket 50. Reference numeral 47 denotes a cylindrical cam, and the central portion of the upper wall thereof is fixed to an output shaft 54 of the motor 52. Reference numeral 56 (FIG. 6) denotes a plate type rotary arm defining a hole at one end receiving the output shaft 54. The arm 56 is positioned in an arm control groove 53 formed on a peripheral wall of the cam 47, and also, is biased against the lower surface of the upper wall of the cam 47 under the resilient force of a coil spring 55 which is compressed and is disposed around the output shaft 54. On the lower surface of the peripheral wall 47a is formed a cam surface 57 extending from one end of the surface defining the groove 53, at the same level as the lower surface of the upper wall of the cam 47, toward the other end of the surface defining the groove 53. The amount that the lifting control cam surface 57 projects from the upper wall of cam 47 gradually increases from a starting end S, slightly lower than a horizontal surface defining the groove 53, toward a terminal end e at which the amount of projection is a maximum. The projecting portion 42 is positioned on a locus of rotation of the arm 56, and a recessed portion 58 is formed on the arm 56. Reference numeral 60 denotes a stopper fixed to the lower horizontal disc portion 78a (FIG. 2) which is adjacent to each of the lead storage containers 24. Reference numeral 62 denotes a stopper fixed to the bracket 50. The shutter plate 32 constitutes an opening/closing mechanism. The motor 52 and the arm 56 constitute an opening/closing control mechanism for controlling the opening/closing of the opening/closing mechanism. The motor 52, cam 47, stoppers 60, 62 and arm 56 constitute a lead push down mechanism. FIG. 7 shows the writing implement stocker 16 and the arm 56 located at standard positions (initial condition). The rotary arm 56 is positioned in a direction corresponding to No. 7 in the drawing wherein it is staggered by 90° from the drawing head 10. In FIG. 7, No. 1 represents the writing implement exchange position, and No. 2 and No. 4 represent exclusive positions at which writing implements having leads whose diameters are 0.3 millimeter are located on the stocker 16. Also, No. 6 and No. 8 represent exclusive positions at which writing implements having leads whose diameters are 0.5 millimeter are located on the stocker 16. At positions immediately above the writing implements P retained by the stocker 16 are located the respective lead storage containers 24 for storing the corresponding leads.

The operation of this embodiment will now be described.

First, the initial setting of the writing implement stocker 16, lead supply stocker 78 and rotary arm 56 will be described.

When the power source of the controller is turned ON, and the initial period setting switch is pressed, the motor 19 is driven after the lapse of 1 second for the safety of the machine, and the writing implement stocker 16 is rotated toward the standard position shown in FIG. 7. The standard position of the stocker 16 is detected by a standard position detecting sensor (not shown in the drawing), and whether each writing implement holding portion 18 of the stocker 16 retains a writing implement P is detected. When the stocker 16 reaches the standard position, the drive of the motor 19 is stopped, and the stocker 16 remains set at the initial position. As described in the foregoing, when the initial setting is completed, the writing implement exchange PC command is inputted to the controller. The stocker 16 is rotated by the PC command, and the writing implement in which the lead according to the kind of pen corresponding to the signal input to the PC command is moved to the No. 1 position in FIG. 7, and the rotation of the stocker 16 is stopped. Next, the drawing head 10 is shifted toward the pen stocker 16 along the rail 6, and the writing implement holding portion 12 of the drawing head 10 receives the writing implement P at the No. 1 position in FIG. 7. Next, the drawing command is inputted to the controller from the computer. The computer discriminates whether the writing implement P retained by the writing implement holding portion 12 has a lead, and if so, the drawing operation is carried out on the basis of the drawing command. If the lead of the writing implement P retained by the writing implement holding portion 12 of the drawing head 10 has run out, the controller discriminates whether the lead automatic lead supply device in the automatic lead supply operation, and if the operation is not taking place, the drawing head 10 returns the writing implement P retained by the holding portion 12 to the corresponding writing implement holding portion 18 on the stocker 16. Next, the controller discriminates whether the lead has run out three or more times, and if so, the drawing head 10 rotates the stocker 16 until the writing implement of the kind identical with the writing implement P returned by the drawing head 10 reaches the head position, namely, position No. 1 in FIG. 1. The drawing head 10 then receives the writing implement P retained on the stocker 16 at position No. 1 in FIG. 7, and then, shifts to carry out the drawing operation. In conjunction with this drawing operation, the automatic lead supply operation is carried out.

Next, the automatic lead supply operation will be described.

Figure 9:
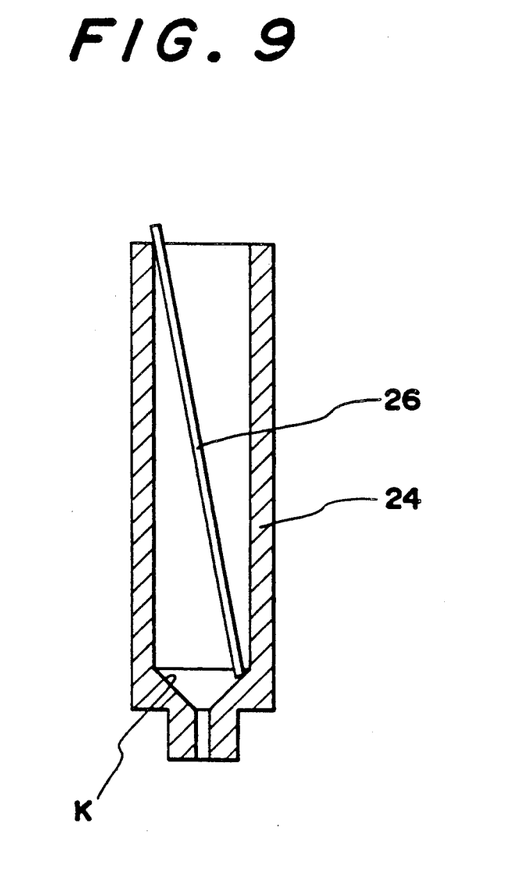
FIG. 9 is a cross-sectional view of another embodiment of a lead storage supply container.

The rotation of the stocker 16 is stopped by the controller when the writing implement P, whose lead has run out and which has been returned by the drawing head 10, has been advanced slightly past the predetermined lead supply position shown by No. 7 in FIG. 7. Next, when the stocker 16 is rotated reversely and the writing implement whose lead has run out is positioned at the lead supply position, the reverse rotation of the stocker 16 is stopped. And then, the controller selects the lead storage container 24 storing the appropriate leads to be supplied to the writing implement whose lead has run out from among the four lead storage containers 24, drives the motor 72 to shift the selected lead storage container 24 to the lead supply position No. 7, and rotates (vibrates) the lead supply stocker 78 repeatedly by N number of times (N being about three times) in forward and reverse directions of rotation. By this rotation, some of the leads 26 in the selected lead storage container 24 drop into the lead guide groove 24c, and furthermore, when the lead supply stocker 78 vibrates in the forward and reverse rotational directions, one lead 26 among the leads in the lead guide groove 24c is guided by the tapered walls 24d and 24e to the center of the external tapered surface 24b and reaches the lead fall hole 28a. The lead 26 having reached the lead fall hole 28a drops into the lead fall holes 28a, 28b under its own weight as shown in FIG. 3. When the vibration of the writing implement stocker 16 is stopped, the other leads in the lead storage container 24 are guided to the lower portion of the external tapered surface 24b as shown in FIG. 2, thereby applying no pressure to the lead in the lead fall holes 28a, 28b. Next, the controller drives the motor 52 and causes the arm 56 to rotate at a high speed for 178.2° in the clockwise direction from the initial condition shown in FIG. 7. Next, the controller causes the output shaft 54 of the motor 52 to rotate at a low speed for 541.8° in the clockwise direction in FIG. 5. The arm 56 collides with the projecting portion 42 of the corresponding shutter plate as initially moved under the low speed rotation of the motor 52. The shutter plate 32 swivels in the counterclockwise direction about the shaft 34 (FIG. 5) by the rotational force of the arm 56 against the elastic force of the spring 44, and the recess portions 36, 58 of the arm 56 and the shutter plate 32, respectively, align with each other as shown in FIG. 3. The lead 26 in the lead fall holes 28a, 28b falls downward by the foregoing operation and is inserted into the lead inserting hole of the writing implement P located immediately below the lead storage container 24. Next, the arm 56 collides with the stopper 60. At this time, the lower end of the lead fall hole 28b is shielded by the upper surface of the shutter plate 32. Next, the arm 56 is released from the arm control groove 53 of the cam 47, and the arm 56 is lowered, in a direction perpendicular to its rotational direction, by the lifting control cam surface 57 of the cam 47. The arm 56 pushes the lead which has fallen into the writing implement P further into the writing implement with its lower surface, and the remaining lead of the writing implement P that has run out is pushed out from the writing implement P. When the pushing of the lead into the writing implement P by the arm 56 is completed, the arm 56 is released from the stopper 60. The arm 56 interlocks with the cam 47 to rotate therewith in the clockwise direction until the arm 56 is engaged with the stopper 62 at the motor side. Next, only the cam 47 rotates in the clockwise direction, and the arm 56 is released from the maximum projecting portion of the cam surface 57, is returned upwardly by the resilient force of the coil spring 55, and is positioned in the arm control groove 53 of the cam 47. Next, the arm 56 is detected by the standard position detecting sensor 64, and when the arm 56 is set in the initial condition as shown in FIG. 7, the controller stops the rotation of the motor 52. Next, the controller rotates the stocker 16 reversibly by a desired number of times in a range of 5° and with this vibration, the remaining leads that failed to fall into the writing implement P supplied with the lead are discharged completely to the lower part of surface 24b. Next, the stocker 16 rotates and sets the writing implement P supplied with the lead to a desired position according to diameters of the lead. By the way, the lead storage container 24 is not particularly limited to having that structure illustrated in FIG. 2 but, as shown in FIG. 9, may have a simple structure in which a tapered surface K is formed on the bottom portion thereof. Also, the opening/closing mechanism, opening/closing control mechanism, and lead push down mechanism are not particularly limited to the structure illustrated in the drawings.

The present invention described in the foregoing is so constructed that the types of leads can be freely combined with any of the writing implements. Furthermore, the lead of a corresponding type may be supplied from the separate lead storage container by rotating the lead supply stocker even if the lead storage container becomes empty during the supply of leads.

What is claimed is:

1. An automatic lead supply device for supplying leads to a plurality of writing instruments, said device comprising:
   a writing implement stocker rotatably mounted in the device about an axis of rotation,
   said writing implement stocker having writing implement holding means for detachably holding a plurality of writing instruments having expendable leads at respective positions lying along a first circular path centered at said axis of rotation;
   first rotary drive means connected to said writing implement stocker for rotating said stocker about said axis of rotation;
   a lead supply stocker rotatably mounted in the device about an axis of rotation and disposed over said writing implement stocker,
   said lead supply stocker having a plurality of lead storage containers disposed at respective positions lying along a second circular path centered at the axis of rotation of said lead supply stocker,
   said first and said second circular paths lying in a common cylindrical plane, each of said lead storage containers having a bottom portion, and a lead fall hole extending through the bottom portion thereof for allowing leads stored in the respective lead storage containers to drop therefrom;

second rotary drive means connected to said lead supply stocker for rotating said lead supply stocker about the axis of rotation thereof;

opening/closing mechanism means disposed adjacent a lower end of the lead fall hole of each of said lead storage containers for selectively closing over and uncovering the lower end of the lead fall hole of each of said lead storage containers;

opening/closing control means operatively associated with said opening/closing mechanism means for controlling said opening/closing mechanism means to close over or to uncover the lower end of the lead fall hole of a selected one of said lead storage containers; and lead push-down mechanism means disposed between said lead storage containers and said writing implement holding means for pushing a lead dropping through the lead fall hole of one of said lead storage containers toward a writing implement held by said writing implement holding means once said opening/closing control means has controlled said opening/closing mechanism means to uncover the lower end of the lead fall hole of said one of said lead storage containers.

* * * * *